United States Patent Office 3,510,220
Patented May 5, 1970

3,510,220
PHOTOGRAPHIC ENLARGER WITH AXIALLY ADJUSTABLE LAMP
Miroslav Bureš, Prerov, Czechoslovakia, assignor to Meopta narodni podnik, Prerov, Czechoslovakia
Filed Dec. 18, 1967, Ser. No. 691,302
Claims priority, application Czechoslovakia, Dec. 19, 1966, 8,095/66
Int. Cl. G03b 27/54
U.S. Cl. 355—67
6 Claims

ABSTRACT OF THE DISCLOSURE

A projection lamp is axially movable in the lamp housing of an enlarger and coupled with a rotatable indicator disc carrying three scales calibrated with magnifications provided by respective interchangeable lenses for the enlarger. The lamp is properly positioned when the magnification value provided by the inserted lens is illuminated through a corresponding opening in the lamp housing. A selector plate is held by a click stop arrangement in each of three positions in which it blocks respective pairs of the openings and simultaneously permits illumination of the portion of a fixed scale indicating the lens used.

BACKGROUND OF THE INVENTION

This invention relates to optical projection apparatus, and particularly to the light source for a photographic enlarger which may be equipped with several interchangeable lenses.

When the objective lens of an enlarger is changed for one of different focal length, it is necessary to adjust the light source in order to avoid uneven illumination of the projected field while utilizing the available light to the fullest possible extent. It is customary, therefore, to provide such an enlarger with interchangeable condenser lenses matched to the objective lenses. It is not practical in this manner to compensate for the changes in lighting caused by different magnification ratios produced with the same objective lens.

It is also possible to adjust the light source for different lenses and for their varying positions relative to the negative being enlarged by changing the position of the enlarger lamp relative to the negative along the optical axis of the enlarger, but apparatus for making the necessary adjustments with ease and precision has not been available heretofore.

The object of the invention is the provision of an enlarger in which the position of the light source can be adjusted for proper compensation of the focal length and magnification ratio of different objective lenses in a very simple manner so that the enlarger can be operated by relatively unskilled personnel quickly and efficiently.

SUMMARY OF THE INVENTION

In one of its more specific aspects, the invention provides an enlarger of the type described with an indicia carrier mounted on the lamp housing, at least a portion of the indicia carrier being visible from outside the housing, and with a coupling arrangement which connects the carrier to a support for the lamp in the housing for joint movement, the support moving along the optical axis of the enlarger. An index provided on the housing is aligned with sequential portions of a scale on the indicia carrier during the aforementioned movement of the latter. The index may consist of means for illuminating the several scale portions individually and sequentially during the movement of the indicia carrier.

When several scales are provided on the carrier, and the index on the lamp housing may be aligned with the portions of each of the scales, a selector is provided for selecting one of the scales for alignment with the index. Where the index illuminates the aligned scale portions, the selector may restrict illumination to one of the scales.

The index may be constituted by several light permeable portions of the lamp housing which are aligned sequentially with the portions of the several scales during movement of the indicia carrier, and the selector may be movably mounted on the housing and have at least one translucent part and several opaque parts. In its several positions, the translucent part of the selector is aligned with a respective one of the light permeable portions of the lamp housing, whereas the other permeable housing portions are aligned with the opaque selector parts. A separate indicator may indicate the position occupied by the selector, and the selector may be secured in each of its positions by a click stop arrangement.

Other features, additional objects, and many of the attendant advantages of this invention will readily be appreciated as the same becomes better understood by reference to the following detailed description of a preferred embodiment when considered in connection with the accompanying drawing.

DESCRIPTION OF THE PREFERRED EMBODIMENT

Figure 1:
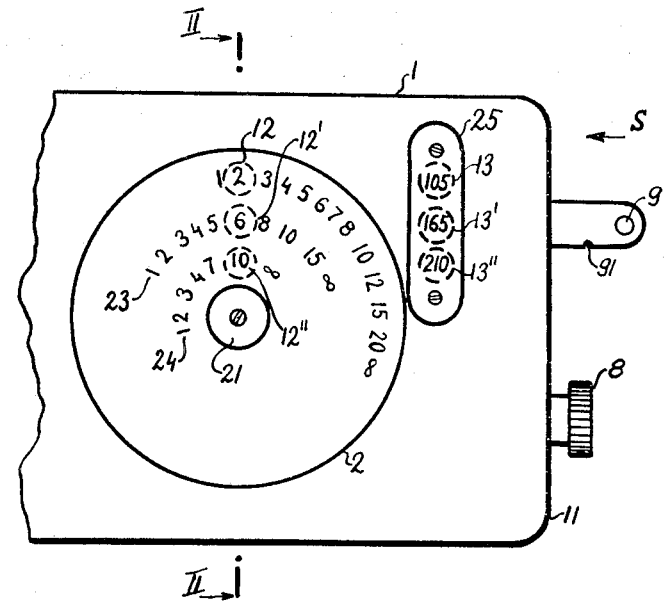
FIG. 1 shows a portion of a photographic enlarger in side elevation.

The drawing shows only as much of an otherwise conventional photographic enlarger as is necessary for an understanding of this invention. The optical axis of the enlarger of this invention. The optical axis of the enlarger is horizontal in the position of the apparatus illustrated in the drawing.

As is seen in FIG. 1, the lamp housing 1 of the enlarger is provided with a circular disc 2 rotatably mounted on the outer face of a side wall 11 of the housing by means of a short shaft 21. The disc 2 carries indicia which are arranged in three concentric, arcuate scales 22, 23, 24 arranged about the axis of rotation of the disc which consists of otherwise transparent or translucent material. The lamp housing wall 11 also carries an indicator plate 25 of similar material. The rows of three openings 12, 12′, 12″ and 13, 13′, 13″ are formed in the wall 11. The openings 12, 12′, 12″ are respectively aligned with respective indicia in the scales 22, 23, 24, and the openings 13, 13′, 13″ are aligned with three indicia on the fixed indicator plate 25.

Figure 2:
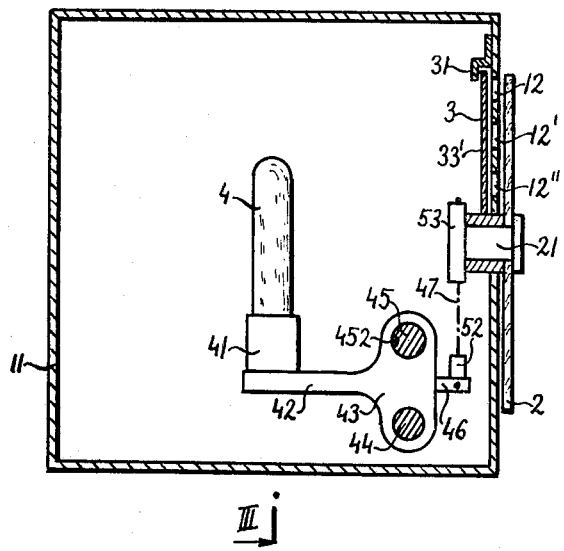
FIG. 2 shows the apparatus of FIG. 1 in section on the line II—II.
Figure 3:
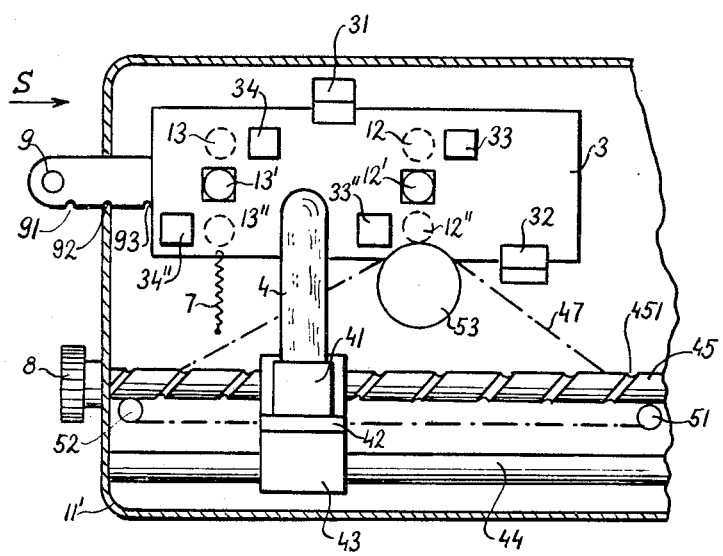
FIG. 3 illustrates the enlarger in section on the line III—III in FIG. 2.

As is better seen in FIGS. 2 and 3, a selector plate 3 is slidably mounted on the inner face of the wall 11 by means of guides 31, 32. The plate 3 is opaque except for two rows of three translucent parts 33, 33′, 33″, and 34, 34′, 34″. The plate moves on the wall 11 in the direction of the optical axis of the enlarger, and the rows of translucent parts are obliquely inclined relative to that direction. In the position of the plate 3 shown in FIG. 3, the translucent portion 34′ of one row is aligned with the opening 13′ while simultaneously the translucent portion 33′ of the other row is aligned with the opening 12′. By shifting the plate 3 on its guides 31, 32, translucent portions 33″, 34″ may be aligned with the openings 12″, 13″, or translucent portions 33, 34 with the openings 11, 12. The translucent portions of the illustrated selector plate 3 are actually square openings.

The projection bulb 4 whose light is projected along the optical axis of the enlarger through a condenser lens, a negative, and an objective lens, not themselves seen in the drawing, is supported on a lamp socket 41 in a conventional manner. The socket is attached to a bracket 42 whose base 43 is movably mounted on two parallel guide rods 44, 45. The rod 44 is a smooth cylinder whereas the rod 45 has a helical groove 451 cut into its otherwise cylindrical surface. A tooth or key 452 projects from the bracket base 43 into the groove 451 for threaded engagement between the rod 45 and the bracket 42.

A fastener 46 projecting from the base 43 toward the wall 11 is fixedly attached to a thin, flexible string 47. The string 47 is trained over two guide pulleys 51 offset on the wall 11 in the direction of the optical enlarger axis and is wound in slightly more than a full turn over a pulley 53 which is fixedly mounted on the shaft 21 of the indicia carrying disc 2.

A handle 9 projects outward through a rear wall of the lamp housing 1 from the selector plate 3. Three notches 91 in the handle 9 are spaced axially as far as the translucent parts or openings in each row 33, 33', 33'' and 34, 34', 34'' are spaced from each other. A helical tension spring 7 attached to the plate 3 and to the housing wall 11 holds the notches 91 in engagement with an edge 92 of the rear wall 11' to provide releasable click stops for the selector plate. The rod 45 also projects outward through the rear wall 11', and its projecting end carries an operating knob 8. When the knob 8 is turned, the lamp 4 moves axially on the rods 44, 45, and the disc 2 is turned simultaneously, being coupled to the lamp supporting structure by the pulley 52 and the string 47.

The afore-described enlarger is operated as follows:

The indicia 105, 165, 210 on the indicator plate 25 related to the focal length in millimeters of the three lenses, not shown, with which the enlarger is equipped. When the 165 mm. lens is used, the handle 9 is brought into the illustrated position in which the edge 92 engages the middle notch 91, whereby the openings 13', 34' are aligned, and light from lamp 4 illuminates the FIG. 165 on the plate 25. It will be appreciated that the lamp 4 is provided with a non-illustrated reflector and other accessories which normally accompany the lamp in an enlarger so that the opening 13' is not exposed to the full beam of the lamp 4, but only to a small amount of light.

The opening 33' in the selector plate 3 simultaneously permits illumination of the scale 23 through the opening 12' in the side wall 11. The scales are calibrated in units of magnification for the associated lenses for which the lamp 4 is properly positioned if the indicia of the scales coincide with the index mark provided by the associated opening 12, 12', 12''. The magnification value at each setting of the objective lens may be read from index marks on the portions of the enlarger not shown in the drawing, as on a focusing knob or the like, or gaged from the distance between the objective lens and an easel. When the objective lens is set for the desired six-fold magnification, the knob 8 is turned until the numeral 6 is illuminated through the opening 12'. The resulting axial position of the lamp 4 is that most suitable for uniformly illuminating the projected field at the highest light intensity available through the 165 mm. objective.

The manner of setting the lighting apparatus for lenses of 105 mm. or 210 mm. focal length and for magnifications other than 6 will be obvious from the above example.

While the invention has been described with reference to an enlarger having three interchangeable objective lenses, the movable lamp-supporting bracket 42 and the coupled, indicia-carrying disc 2 may also be employed to advantage in enlargers having but one, fixed objective lens for adjusting the illumination of the projected field to the wide range of magnification ratios which is available even with a single lens.

Obviously, many modifications and variations of the present invention are possible in the light of the above teachings. It is therefore to be understood that, within the scope of the appended claims, the invention may be practiced otherwise than as specifically described.

I claim:
1. In a photographic enlarger, in combination:
 (a) a lamp housing having an axis;
 (b) a lamp support mounted in said housing for movement in the direction of said axis;
 (c) lamp means on said support for projecting a light beam in said direction;
 (d) an indicia carrier mounted on said lamp housing, at least a portion of said carrier being visible from outside said housing;
 (e) coupling means connecting said carrier and said support for joint movement;
 (f) a scale on said indicia carrier;
 (g) index means on said housing aligned with sequential portions of said scale during said movement of the carrier; and
 (h) means for illuminatitng said portions individually and sequentially during said movement of said carrier.

2. In an enlarger as set forth in claim 1, a plurality of scales extending on said carrier in the direction of movement of the same, index means on said housing alignable with sequential portions of each of said scales during said movement of the carrier, and selector means for selecting one of said scales for alignment of the portions thereof with said index means.

3. In an enlarger as set forth in claim 2, said index means including means for alternatively illuminating the sequential portions of said scales during said movement of said carrier, and the selector means restricting illumination to the portions of one of said sales.

4. In an enlarger as set forth in claim 3, a plurality of portions of said lamp housing being permeable to light and jointly constituting said index means, said indicia carrier being mounted on said housing for sequential movement of said scales through positions of alignment with said light permeable portions respectively, and said selector means including a selector member movably mounted on said housing and having a part which is translucent and other parts which are opaque, the selector member being movable between a plurality of positions in which the translucent part thereof is aligned with a respective one of said light permeable portions, whereas the other light permeable portions of said housing are aligned with said opaque portions of the selector member.

5. In an enlarger as set forth in claim 4, indicating means on said housing for indicating the position of said selector member.

6. In an enlarger as set forth in claim 4, click stop means for releasably securing said selector member in each of said positions thereof.

References Cited

UNITED STATES PATENTS

| 2,130,562 | 9/1938 | Pratt | 353—87 X |
| 2,512,314 | 6/1950 | Dutton | 353—87 X |

FOREIGN PATENTS 977,388   12/1964   Great Britain.

NORTON ANSHER, Primary Examiner

R. A. WINTERCORN, Assistant Examiner

U.S. Cl. X.R.
240—44.2; 353—87